US009742260B2

(12) United States Patent
Della Flora

(10) Patent No.: US 9,742,260 B2
(45) Date of Patent: Aug. 22, 2017

(54) INVERTER SYNCHRONIZATION

(71) Applicant: Danfoss Power Electronics A/S, Graasten (DK)

(72) Inventor: Leandro Della Flora, Loves Park, IL (US)

(73) Assignee: Danfoss Power Electronics A/S, Graasten (DK)

(*) Notice: Subject to any disclaimer, the term of this patent is extended or adjusted under 35 U.S.C. 154(b) by 0 days.

(21) Appl. No.: 14/895,298

(22) PCT Filed: Jun. 10, 2014

(86) PCT No.: PCT/IB2014/062085
§ 371 (c)(1),
(2) Date: Dec. 2, 2015

(87) PCT Pub. No.: WO2014/203116
PCT Pub. Date: Dec. 24, 2014

(65) Prior Publication Data
US 2016/0105093 A1   Apr. 14, 2016

Related U.S. Application Data

(60) Provisional application No. 61/836,766, filed on Jun. 19, 2013.

(51) Int. Cl.
*H02M 7/44* (2006.01)
*H02M 1/32* (2007.01)
(Continued)

(52) U.S. Cl.
CPC .............. *H02M 1/32* (2013.01); *H02J 3/383* (2013.01); *H02J 3/42* (2013.01); *H02M 7/44* (2013.01); *H02M 7/48* (2013.01); *Y02E 10/563* (2013.01)

(58) Field of Classification Search
CPC .......... H02M 7/44; H02M 1/32; H02M 5/458; H02M 2001/007; H02M 7/53832; H02J 3/42; H02J 3/38
(Continued)

(56) References Cited

U.S. PATENT DOCUMENTS 5,268,832 A * 12/1993 Kandatsu ............... G05F 1/67
                                                      323/299
6,487,096 B1 * 11/2002 Gilbreth .................. H02J 1/10
                                                       363/35
(Continued)

FOREIGN PATENT DOCUMENTS

CN      101662155 A      3/2010
CN      202406053 U      8/2012
(Continued)

OTHER PUBLICATIONS

International Search Report for PCT Serial No. PCT/IB2014/062085 dated Sep. 18, 2014.
(Continued)

*Primary Examiner* — Rajnikant Patel
(74) *Attorney, Agent, or Firm* — McCormick, Paulding & Huber LLP

(57) ABSTRACT

A method of initiating a grid-tied inverter is described, in which in-rush currents and DC overvoltage conditions are reduced or avoided. The method uses a pulse width modulator to drive the inverter under the control of a voltage feedforward signal such that the inverter output is dependent on the measured grid voltage. Then, an AC current feedback controller is enabled and the pulse width modulator is used to drive the inverter under the control of both the voltage feedforward control signal and the feedback control signal.

17 Claims, 2 Drawing Sheets

(51) Int. Cl.
*H02J 3/38* (2006.01)
*H02J 3/42* (2006.01)
*H02M 7/48* (2007.01)

(58) Field of Classification Search
USPC ...... 363/16–17, 49, 65, 71, 132, 95; 307/31, 307/51, 19, 87
See application file for complete search history.

(56) References Cited

U.S. PATENT DOCUMENTS

| | | | | |
|---|---|---|---|---|
| 7,015,597 | B2* | 3/2006 | Colby | H02J 3/1835 307/31 |
| 7,183,667 | B2* | 2/2007 | Colby | H02J 3/42 307/19 |
| 7,193,872 | B2* | 3/2007 | Siri | H02M 3/33592 363/95 |
| 8,503,200 | B2* | 8/2013 | Chapman | H02J 3/383 363/131 |
| 2005/0017699 | A1* | 1/2005 | Stanley | G05F 1/70 323/282 |
| 2005/0135031 | A1 | 6/2005 | Colby et al. | |
| 2006/0050458 | A1 | 3/2006 | Johnson | |
| 2007/0159866 | A1* | 7/2007 | Siri | H02M 3/33592 363/95 |
| 2009/0021082 | A1 | 1/2009 | Loucks et al. | |
| 2009/0146505 | A1 | 6/2009 | Powell et al. | |
| 2011/0216562 | A1 | 9/2011 | Gengenbach | |
| 2012/0049637 | A1 | 3/2012 | Teichmann et al. | |
| 2012/0083935 | A1 | 4/2012 | Wells | |

FOREIGN PATENT DOCUMENTS

| | | |
|---|---|---|
| EP | 2 242 160 A1 | 10/2010 |
| EP | 2 416 480 A2 | 2/2012 |
| GB | 2483910 A | 3/2012 |
| WO | 2008138016 A1 | 11/2008 |
| WO | 2013/131115 A2 | 9/2013 |

OTHER PUBLICATIONS

Bueno E J et al: "SPLL design to flux oriented of a VSC interface for wind power applications", Industrial Electronics Society, 2005 IECON 2005 Nov. 2005.

* cited by examiner

INVERTER SYNCHRONIZATION

CROSS-REFERENCE TO RELATED APPLICATIONS

This application is entitled to the benefit of and incorporates by reference subject matter disclosed in the International Patent Application No. PCT/IB2014/062085 filed on Jun. 10, 2014 and U.S. Provisional Patent Application No. 61/836,766 filed Jun. 19, 2013.

TECHNICAL FIELD

The present invention relates to grid-tied pulse-width modulated (PWM) inverters used to connect renewable energy sources (such as solar panels), active loads or active power filters to an electrical grid.

BACKGROUND

FIG. 1 is a block diagram of a system, indicated generally by the reference numeral 1, that illustrates some of the problems that the present invention seeks to address.

The system 1 comprises a DC source 2, an inverter 4, a PWM controller 6, a paralleling device 8 and an AC grid 10.

The DC source 2 provides DC power to the inverter 4. As is well known the art, the inverter 4 can be switched under the control of the PWM controller 6 to generate an AC supply for provision to the grid 10. The paralleling device 8 (which may be a switch) is provided to selectively connect the output of the inverter 4 to the grid 10.

The inverter 4 is used to convert electrical energy provided by the DC source 2 into the AC form required by the grid 10 by generating output currents that match the grid voltages in frequency, but that have amplitude and phase dependent on factors such as the amount of input power, the grid voltage level and the reactive power setpoint. Typically, the inverter 4 has a DC-bus capacitor bank connected to the inverter input circuit and an AC filter connected to the inverter output.

The physical connection of the inverter 4 to the grid 10 is carried out by the paralleling device 8. The paralleling device is typically instructed to connect the inverter 4 with the grid 10 during the inverter startup procedure.

Depending on the amplitude, phase and frequency deviation between the voltages on each side of the paralleling device 8, there may be an in-rush current at the moment the paralleling device 8 is closed. Another potential side-effect of improper inverter startup is a temporary reverse power flow from the grid 10 to the inverter 4 during the transition from off-grid to on-grid operation. Such reverse power flow can cause DC-bus capacitors to become overcharged.

In other scenarios, the inverter 4 can already be connected to the grid 10 (such that the paralleling device 8 is closed) but not actively producing any current or voltage for provision to the grid. This is typically referred to as the inverter being in a "coast" or "idle" mode of operation and the transition from such an idle mode to a running mode can also generate in-rush currents on the AC side and/or overvoltages on the DC-side.

A number of methods are known for connecting inverters (such as the inverter 4) to an AC grid (such as the grid 10) using a paralleling device.

In a first method, the paralleling device 8 is closed before the inverter 4 starts to generate output voltages or currents. This first method does not avoid the problem of in-rush currents outlined above. This method can perturb the grid voltages, cause interference to adjacent equipment and reduce the lifetime of inverter parts.

In a second method, the grid-side voltages are monitored and the paralleling device 8 is closed at a zero-crossing. The second method does not eliminate the in-rush currents due to the time the paralleling device takes to respond once zero-crossing is detected. In addition, this method is not applicable to multi-phase paralleling devices that close all phases at the same time.

In a third method, the voltages on the inverter side are actively measured and controlled to minimise the amplitude, phase and frequency deviation from the grid-side voltages. The third method required voltage sensors to be placed on both sides of the paralleling device, which are used within a dedicated voltage feedback control system specifically designed to make the inverter-side voltages converge to the grid-side voltages prior to closing the paralleling device. In addition to the cost and complexity of such a solution, since the voltage controller essentially operates with highly reactive components in the inverter output filter, the convergence time of the third method is typically many grid cycles and there is a risk of instability or the need to retune the controller due to ageing in the hardware components of the inverter.

SUMMARY

The present invention seeks to address at least some of the problems outlined above.

The present invention provides a method (for example of initiating or synchronizing a grid-tied inverter), the method comprising: enabling an AC voltage feedforward controller of the grid-tied inverter; setting a voltage feedforward gain of the AC voltage feedforward controller to unity (e.g. by ramping up to 1) and using the AC feedforward controller to generate a feedforward control signal that is a product of a measured voltage of the grid and the voltage feedforward gain; using a pulse width modulator to drive the inverter under the control of the feedforward control signal, such that the inverter output is dependent on the measured grid voltage; enabling an AC current feedback controller; using the AC current feedback controller to generate a feedback control signal based on a measured output current of the inverter; and using the pulse width modulator to drive the inverter under the control of both the feedforward control signal and the feedback control signal. Thus, the method initially uses the pulse width modulator to drive the inverter under the control of a voltage feedforward signal such that the inverter output is dependent on the measured grid voltage and then the AC current feedback controller is enabled and the pulse width modulator is used to drive the inverter under the control of both the voltage feedforward control signal and the feedback control signal.

The present invention also provide an inverter (typically a grid-tied inverter) comprising: an AC voltage feedforward controller having a voltage feedforward gain, wherein the AC feedforward controller is used to generate a feedforward control signal that is a product of a measured voltage of the grid and the voltage feedforward gain; an AC current feedback controller that is configured to generate a feedback control signal based on a measured output current of the inverter; and a pulse width modulator that drives the inverter, wherein: with the AC current feedback controller disabled and the voltage feedforward gain of the AC voltage feedforward controller set to unity, the pulse width modulator drives the inverter under the control of the feedforward control signal, such that the inverter output is dependent on the measured grid voltage; and with the AC current feedback controller enabled, the pulse width modulator drives the inverter under the control of both the feedforward control signal and the feedback control signal.

Thus, the measured grid voltage may be used directly to command the inverter in a feedforward fashion in which the inverter current feedback controller is initially deactivated but gradually introduced to implement a soft transition from the voltage-control mode of operation to a current-control mode of operation. This ensures that the inverter-side voltage matches the grid-side voltage in frequency prior to the closing of the paralleling device/AC relay, thereby eliminating the initial in-rush current. As described below, the same basic principles can be applied regardless of whether the inverter is already connected to the grid in a coast mode.

An AC relay (or some other paralleling device) may be used to connect the inverter to the grid.

In the event that the AC relay is initially in an open position, the AC relay may be closed when the pulse width modulator is driving the inverter under the control of the feedforward control signal and the AC current feedback controller enabled after the AC relay is closed.

In the event that the AC relay is initially closed, the pulse width modulator may be enabled after the AC voltage feedforward controller has been enabled with unity voltage feedforward gain. In this embodiment, the AC current feedback controller may be initiated after the pulse width modulator has been started.

In some forms of the invention, the voltage feedforward gain of the AC voltage feedforward controller is reduced from unity to a normal operating value (e.g. 0.8) after the AC current feedback controller is enabled. The reduction may be by ramping.

A DC-bus voltage controller may be provided that is configured to regulate the inverter DC bus voltage. In many forms of the invention, the DC-bus voltage controller is enabled after the AC current feedback controller has been enabled (although this is not essential to all forms of the invention: for example, the DC-bus voltage controller and the AC current feedback controller may be enabled at the same time). The DC-bus voltage controller may have a first, faster, mode of operation and a second, slower, mode of operation, wherein, when the DC-bus voltage controller is enabled, the first mode of operation is used and, after a period of time, the second mode of operation is used.

Thus, the current controller may initially be driven by the so-called fast DC-bus voltage regulator, which is designed such that the DC-bus voltage is kept under control during the startup sequence. The fast DC-bus voltage regulator can then be replaced with the slow voltage regulator that is needed for the normal operation of the inverter to ensure good performance (for example, in terms of current harmonic distortion).

The inverter may be a single phase inverter. Alternatively, the inverter may be a multi-phase inverter. Closing the AC relay of such a multi-phase inverter would typically comprise connecting each phase of the inverter to the utility grid.

In many forms of the invention, a DC source, such as an array of solar panels, may be used to provide a DC input to the inverter.

BRIEF DESCRIPTION OF THE DRAWINGS

The invention will now be described in further detail with reference to the following schematic drawings, in which.

DETAILED DESCRIPTION

Figure 1:
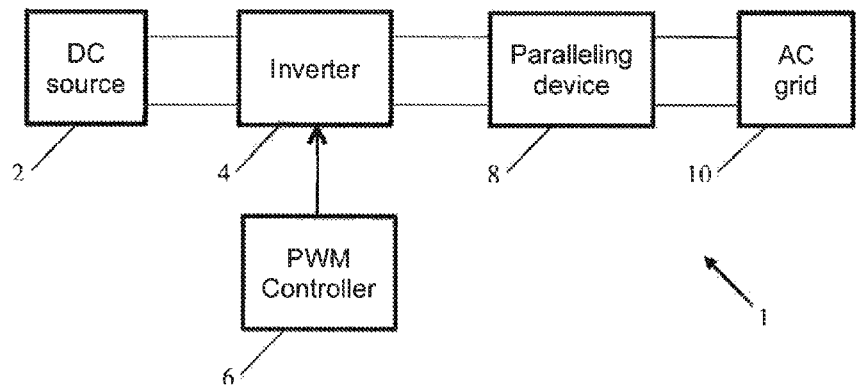
FIG. 1 is a block diagram of a known grid-tied inverter.
Figure 2:
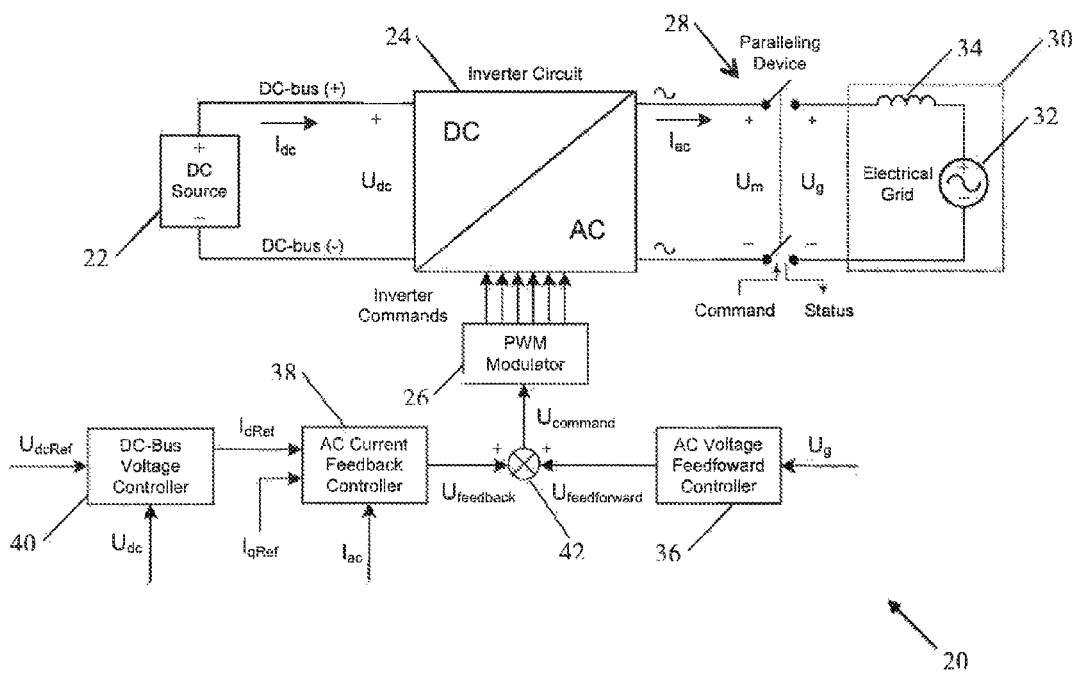
FIG. 2 is a block diagram of a grid-tied inverter in accordance with an aspect of the present invention.

FIG. 2 is a block diagram of a grid-tied inverter system, indicated generally by the reference numeral 20, in accordance with an aspect of the present invention.

The system 20 comprises a DC source 22 (such as an array of solar panels), an inverter 24, a PWM modulator 26, a paralleling device 28 and an electrical grid 30 that are similar to the elements 2 to 10 of the system 10 described above. As shown in FIG. 2, the AC grid 30 is represented by an AC supply 32 and an inductance 34. As described in detail below, the system 20 additionally comprises an AC voltage feedforward controller 36, an AC current feedback controller 38, a DC-bus voltage controller 40 and a summer 42.

The AC voltage feedforward converter 36 generates an inverter feedforward command $U_{feedforward}$ based on the grid-side voltage measurement $U_g$. In typical designs, the feedforward controller simply multiplies the measured grid voltage $U_g$ by a feedforward gain $k_{ff}$ to provide the signal $U_{feedforward}$. As described in detail below, the method of the present invention manipulates the feedforward gain $k_{ff}$ to alter the impact of the grid voltage $U_g$ on the control of the inverter 24.

The AC current feedback controller 38 controls the inverter output current $I_{ac}$ to match the active current setpoint $I_{dRef}$ and the reactive current setpoint $I_{dRef}$. The AC current feedback controller 38 generates the voltage feedback command $U_{feedback}$ that is used in combination with the voltage feedforward command $U_{feedforward}$ to produce the reference voltage $U_{command}$ for the inverter output stage.

The DC-bus voltage controller 40 regulates the inverter DC bus voltage $U_{dc}$ to match the reference $U_{dcRef}$ by adjusting the active current setpoint $I_{dRef}$ used within the AC current feedback controller 38 as described above. In typical designs, the DC-bus voltage controller 40 contains a proportional-integral feedback compensator (PI-controller) that can be combined to feedforward control. The present algorithm (as described in detail below) provides a first (fast) control mode designed to provide a fast response during the paralleling process and a second (slow) control mode designed with a slower dynamic response specifically for the normal running mode of the system. The algorithm uses the first (fast) DC-bus control mode to avoid DC overvoltage until the transition is fulfilled. The algorithm gradually replaces the first (fast) DC-bus control mode with the second (slow) DC-bus control mode before the inverter enters the normal running mode of the system.

According to one embodiment of the invention, the first (fast) DC-bus control mode is implemented using a value of the proportional gain $k_p$ that is larger than the proportional gain used during the normal on-grid operation. In addition, the DC-bus voltage controller 40 may be implemented digitally and as such the rate of execution may be higher during the paralleling process to ensure optimal control performance.

The DC-bus voltage controller 40 described above represents one possible implementation. Other types of controllers besides the PI-type and other forms of implementation may be provided. In addition, the need for having a fast design and a slower design is also subject to variations depending the specific inverter 24 being used. The way the controller is initialised and the form of setpoint is determined is also subject to variations. This, and some other possible variants of the system 20 are described further below.

In the overall control scheme, the inverter circuit 24 is driven by the voltage command $U_{command}$, which is turned by the PWM modulator 26 and dedicated circuits into commands to open or close the inverter electronic switches (as is well known in the art). The signal $U_{command}$ is generated by the summer 42 from the sum of the signals $U_{feedback}$ and $U_{feedforward}$.

Other functions that make up the inverter control system, such as the logic that generates the voltage setpoint $U_{dcRef}$ for the DC-bus voltage regulator 40, the reactive power controller that produces the reactive current setpoint $I_{qRef}$, the inverter protection functions, phase-locked-loop etc. are omitted for the sake of simplicity and brevity. The person skilled in the art will be aware of many implementations for such features.

In addition, at the moment the algorithm is initiated, it is assumed that all preliminary routines, such as inverter self-check (if provided), DC-capacitor pre-charge, paralleling with the DC-source, monitoring of grid conditions, phase-locked-loop etc. have already been initiated so that the primary function of the present algorithm described herein is to ensure that the inverter parallels with the AC grid 30 in a controlled manner in order to eliminate in-rush currents and to avoid DC overvoltage when the inverter is previously either off-grid or in a coasting mode.

Figure 3:
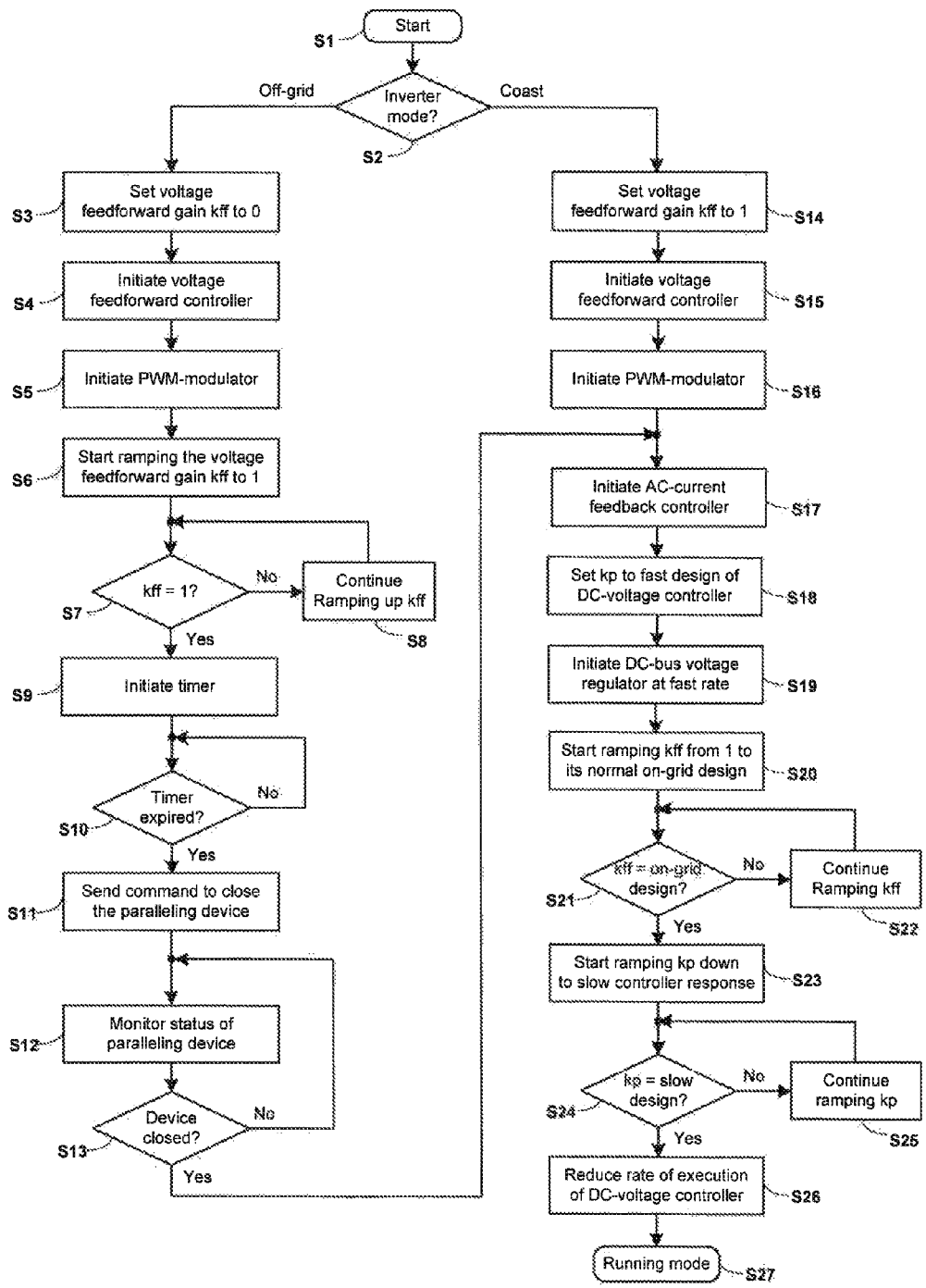
FIG. 3 is a flow chart showing an algorithm in accordance with an aspect of the present invention.

FIG. 3 is a flow chart showing an algorithm, indicated generally by the reference numeral 100, in accordance with an aspect of the present invention.

Initially, when the algorithm starts at step S1, the inverter 24 is not actively producing any voltage or currents at its output, which means that the PWM modulator 26, the AC voltage feedforward controller 36, the AC current feedback controller 38 and the DC-bus voltage controller 40 are not under execution.

At step S2, the specific operation mode determines the synchronization procedure to be followed. In the event that the inverter is off-grid, the paralleling device 28 is open and the voltage on the inverter side does not match the voltage on the grid-side. In this situation, the algorithm moves to step S3. In the event that the inverter is in an idle/coasting mode, the algorithm moves to step S14 described further below.

At step S3, the feedforward gain $k_{ff}$ is set to zero. Then, the AC voltage feedforward controller 36 and the PWM modulator 26 are initiated (at steps S4 and S5 respectively) in order to build up the inverter-side voltage $U_m$.

At steps S6 to S8, the feedforward gain $k_{ff}$ is gradually increased from 0 to 1 within a predetermined amount of time $T_1$. After that, $k_{ff}$ is kept at 1 and a timer is activated for another predetermined period of time $T_2$ (step S9). At this stage, since the AC current feedback controller 38 has not yet been initiated, the input to the PWM modulator ($U_{command}$) is dependent entirely on the output of the AC voltage feedforward controller ($U_{feedforward}$). Since $k_{ff}=1$, $U_{feedforward}$ follows $U_g$. Thus, the inverter output is controlled so that it follows the grid voltage $U_g$.

When the time $T_2$ expires (step S10), a command is sent to close the AC paralleling device 28 (step S11) and the state of the paralleling device is monitored (step S12). When the paralleling device 28 is closed, the inverter output should match the grid voltage $U_g$ (for the reasons outlined above) such that in-rush currents and DC overvoltage conditions are avoided.

Once the paralleling device is detected to be closed (step S13), the algorithm moves to step S17, where the AC feedback current controller 38 and the DC bus voltage controller 40 (specifically the fast DC-bus voltage regulator of the controller 40) are activated (steps S17 to S19). As described above, the fast DC-bus voltage regulator mode is used at this stage in order to control the DC voltage to avoid DC overvoltage conditions.

Following step S19, the voltage feedforward gain $k_{ff}$ is ramped down (steps S20 to S22) in a predetermined amount of time $T_3$ from 1 to the value the normal on-grid operating value (which might, for example, be 0.7). The control input to the PWM modulator ($U_{command}$) is now dependent on a proportion of the grid-side ($U_g$) and a proportion of the output of the AC current feedback controller 38, as desired under the normal operation of the inverter.

Once the voltage feedforward gain $k_{ff}$ has been reduced to the normal operating level, the fast DC-bus controller is gradually replaced with the slow DC-bus controller (i.e. the "normal mode" DC-bus voltage controller) by ramping down the proportional gain $k_p$ for a predefined period of time $T_4$ from the fast to the slow design (steps S23 to S25).

After the proportional gain reaches its normal designed value (for the "normal mode"), the DC-voltage regulator is executed at its normal rate (step S26), which concludes the synchronization algorithm (step 27).

Thus, the algorithm 100 directly uses the measured grid voltage $U_g$ to command the inverter in a feedforward fashion in which the inverter current feedback controller 38 is initially deactivated but gradually introduced to implement a soft transition from the voltage-control mode of operation to a current-control mode of operation. This ensures that the inverter-side voltage matches the grid-side voltage in amplitude, phase and frequency prior to the closing of the paralleling device 28, thereby eliminating the initial in-rush current. The current controller is initially driven by the so-called fast DC-bus voltage regulator, which is designed such that the DC-bus voltage is kept under control during the startup sequence. The fast DC-bus voltage regulator is then replaced with the slow voltage regulator that is needed for the normal operation of the inverter to ensure good performance (for example, in terms of current harmonic distortion). As described below, the same basic principles can be applied when the inverter 24 is already connected to the grid 30 in a coast mode.

As indicated above, in the case that the inverter is operating in a coast mode, at step S2, the algorithm moves to step S14 (such that steps S14 to S16 are carried out instead of the steps S3 to S13 described above).

At step 14, the voltage feedforward gain $k_{ff}$ is set to 1 and, at step S15, the AC voltage feedforward controller 36 is initiated.

At step S16, the PWM modulator 26 is initiated. This is required since the modulator would be deactivated in the coast mode.

Once activated, the PWM modulator 26 is driven by a control voltage ($U_{command}$) that is dependent entirely on the grid voltage $U_g$. Thus, when the PWM modulator is activated (at step S16), the inverter is controlled such that the output of the inverter matches the grid voltage $U_g$. Thus, in-rush currents and DC overvoltage conditions are avoided.

From step S16, the algorithm proceeds to step S17 and the steps S17 to S27 are carried out as described above.

The embodiment of the invention described above is subject to many variations, such as the following:

1. Sensors can installed on the inverter-side of the paralleling device 28 to evaluate, for example, if the deviation between the inverter and the grid-side voltages is below a predefined threshold, which can be used during step S11 as an extra condition to close or not close the paralleling device. A distinction between the algorithm 100 and other known solutions may be that if the inverter-side voltage is measured, it is not used by a feedback control system to actively correct eventual deviations with respect to the grid-side voltage measurements.

2. Although most grid-tied PWM inverters have filters between the inverter electronic switches and the paralleling device, such that the current on the inverter-side of the filter is controlled instead of the current on the grid-side of the filter, the invented algorithm is applicable to controlling the current on either side of the filter.

3. The electrical grid 30 represented in FIG. 2 is a simplified model consisting of a voltage source in series with an inductance; however, in actual installations there may be a whole variety of equipment, such as filters, switches, circuit breakers, transformers, loads, sources, etc. The algorithm is applicable regardless of the complexity of the grid to which the inverter is connected.

4. The simplified representation of grid-tied PWM inverters as shown in FIG. 2 does not distinguish between single or multi-phase inverters; the algorithm is applicable regardless of the number of wire connections (phases) between the inverter and the electrical grid. The invention is also applicable to inverters with or without connection with the grid neutral wire or to ground.

5. In practical implementations, the AC voltage feedforward controller 36 can contain filters, analog-to-digital converters, phase-delay compensators, transformations, etc., that are omitted from the invention description for simplicity. The invented algorithm defines the voltage feedforward gain $k_{ff}$ as representing the equivalent loop-gain at the grid-frequency from the point where the grid-side voltage $U_g$ is measured to the actual inverter output voltage $U_m$ regardless of the actual number and complexity of the elements inserted between these two points.

6. At steps S20 to S22, the feedforward gain is gradually ramped from 1 to its normal on-grid design but these steps can be skipped it there is no difference between the value of $k_{ff}$ during the inverter paralleling mode of operation and the value set to on-grid mode.

7. The voltage drop and phase-delay introduced in the feedforward loop by elements like the inverter output filter, signal conditioning circuits, sampling, digital processing, etc., can be estimated and compensated if needed to ensure a good match between the inverter and grid side voltages.

8. Although the preferred embodiment of the invention describes the DC-bus voltage controller 40 as a PI-type of regulator with digital implementation, other types of control schemes besides the PI-regulator and other forms of implementation can be used instead. In addition, the need for having fast and slow design is not mandatory but depends on the specific inverter requirements. In case both designs are needed the transition between fast to slow controller does not have to occur necessarily according to the embodiment of the invention described above, but it is subject to variations depending on the control scheme that is in use. Also, the way the DC-bus voltage controller 40 is initialized and the form its setpoint is determined can vary.

9. The transition between fast and slow DC-bus voltage controller does not need to be after the feedforward gain is ramped down to its normal design value but before that or concomitantly.

10. Instead of using the fast DC-bus voltage regulator to avoid DC-overvoltage, the active command for the AC-current controller can be initiated at a certain threshold to ensure that the inverter starts outputting power as soon as the inverter is physically connected with the grid.

11. The invention has instances where gains are ramped up or down for predefined periods of time like at steps S6 to S8 and S20 to S25; however, the need for performing gradual transition is not mandatory but is subject to variations depending on the actual inverter requirements. Furthermore, if a gradual transition is required, the transition does not necessarily have to be implemented in the form of ramp with respect to time.

12. Steps S9 to S10 implement a delay before the paralleling device is commanded to close but these steps can be omitted depending on the specific inverter requirements.

13. At steps S12 and S13 the status of the paralleling device is checked before proceeding to step S17; alternative variations need not check the device status but wait a predetermined amount of time, skip steps S12 and S13 or utilize other ways to detect when the connection is fulfilled.

14. Although the embodiment of the invention considers the energy as being transformed from the DC-source to the AC grid, the invention is readily applicable to any type of grid-tied pulse-width modulated inverter that exchanges power between the AC and DC ends regardless of the direction of the energy flow. Thus, for example, the invention is applicable to active front end rectifiers and active power filters.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A method comprising:
    enabling an AC voltage feedforward controller of a grid-tied inverter;
    setting a voltage feedforward gain of the AC voltage feedforward controller to unity and using the AC feedforward controller to generate a feedforward control signal that is a product of a measured voltage of the grid and the voltage feedforward gain;
    using a pulse width modulator to drive the inverter under the control of the feedforward control signal, such that the inverter output is dependent on the measured grid voltage;
    enabling an AC current feedback controller;
    using the AC current feedback controller to generate a feedback control signal based on a measured output current of the inverter;
    using the pulse width modulator to drive the inverter under the control of both the feedforward control signal and the feedback control signal, and
    connecting the inverter to the grid by an AC relay.

2. The method as claimed in claim 1, wherein, in the event that the AC relay is initially in an open position, the AC relay is closed when the pulse width modulator is driving the inverter under the control of the feedforward control signal and the AC current feedback controller is enabled after the AC relay is closed.

3. The method as claimed in claim 1, wherein, in the event that the AC relay is initially closed, the pulse width modulator is enabled after the AC voltage feedforward controller has been enabled with unity voltage feedforward gain.

4. The method as claimed in claim 1, further comprising reducing the voltage feedforward gain of the AC voltage feedforward controller from unity to a normal operating value after the AC current feedback controller is enabled.

5. The method as claimed in claim 1, further comprising a DC-bus voltage controller configured to regulate the inverter DC bus voltage.

6. The method as claimed in claim 5, wherein the DC-bus voltage controller is enabled after or at the same time as the AC current feedback controller has been enabled.

7. The method as claimed in claim 5, wherein the DC-bus voltage controller has a first, faster, mode of operation and a second, slower, mode of operation, wherein, when the DC-bus voltage controller is enabled, the first mode of operation is used and, after a period of time, the second mode of operation is used.

8. An inverter comprising:
an AC voltage feedforward controller having a voltage feedforward gain, wherein the AC feedforward controller is used to generate a feedforward control signal that is a product of a measured voltage of the grid and the voltage feedforward gain;
an AC current feedback controller that is configured to generate a feedback control signal based on a measured output current of the inverter;
an AC relay connecting the inverter to the grid; and
a pulse width modulator that drives the inverter,
wherein:
with the AC current feedback controller disabled and the voltage feedforward gain of the AC voltage feedforward controller set to unity, the pulse width modulator drives the inverter under the control of the feedforward control signal, such that the inverter output is dependent on the measured grid voltage; and
with the AC current feedback controller enabled, the pulse width modulator drives the inverter under the control of both the feedforward control signal and the feedback control signal.

9. The inverter as claimed in claim 8, wherein, in the event that the AC relay is initially in an open position, the AC relay is closed when the pulse width modulator is driving the inverter under the control of the feedforward control signal and the AC current feedback controller is enabled after the AC relay is closed.

10. The inverter as claimed in claim 8, wherein, in the event that the AC relay is initially closed, the pulse width modulator is enabled after the AC voltage feedforward controller has been enabled with unity voltage feedforward gain.

11. The inverter as claimed in claim 8, further comprising a DC-bus voltage controller configured to regulate the inverter DC bus voltage.

12. The inverter as claimed in claim 11, wherein the DC-bus voltage controller is enabled after or at the same time as the AC current feedback controller has been enabled.

13. The inverter as claimed in claim 8, wherein the inverter is a multi-phase inverter.

14. The method as claimed in claim 2, wherein, in the event that the AC relay is initially closed, the pulse width modulator is enabled after the AC voltage feedforward controller has been enabled with unity voltage feedforward gain.

15. The method as claimed in claim 2, further comprising reducing the voltage feedforward gain of the AC voltage feedforward controller from unity to a normal operating value after the AC current feedback controller is enabled.

16. The method as claimed in claim 3, further comprising reducing the voltage feedforward gain of the AC voltage feedforward controller from unity to a normal operating value after the AC current feedback controller is enabled.

17. The method as claimed in claim 2, further comprising a DC-bus voltage controller configured to regulate the inverter DC bus voltage.

* * * * *